United States Patent
Kutscher

(10) Patent No.: US 6,208,243 B1
(45) Date of Patent: Mar. 27, 2001

(54) VEHICLE HAVING POSITION GENERATORS ASSIGNED TO THE WHEELS

(75) Inventor: Eberhard Kutscher, Marbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/965,114

(22) Filed: Nov. 6, 1997

(30) Foreign Application Priority Data

Nov. 7, 1996 (DE) ............................................. 196 45 897

(51) Int. Cl.⁷ .................................................. G01M 17/02
(52) U.S. Cl. ........................................ 340/443; 73/146.2
(58) Field of Search ............................. 340/443; 73/146.2

(56) References Cited

U.S. PATENT DOCUMENTS

| | | | |
|---|---|---|---|
| 4,980,830 | 12/1990 | Aoki et al. | ............... 280/707 X |
| 5,808,190 | * 9/1998 | Ernst | ................ 73/146.2 X |
| 5,895,846 | * 4/1999 | Chamussy et al. | ............ 73/146.2 |

FOREIGN PATENT DOCUMENTS

| | | |
|---|---|---|
| 23 47 793 | 4/1975 | (DE) . |
| 39 20 165 A1 | 12/1989 | (DE) . |
| 40 09 540 | 9/1991 | (DE) . |
| 0 743 202 A1 | 11/1996 | (EP) . |
| 2270167 | 3/1994 | (GB) . |
| 2 311 886 | 10/1997 | (GB) . |

\* cited by examiner

*Primary Examiner*—Thomas P. Noland
(74) *Attorney, Agent, or Firm*—Evenson, McKeown, Edwards & Lenahan, P.L.L.C.

(57) ABSTRACT

In a vehicle having wheels with inflatable tires, position generators are assigned to each wheel to detect the distances between the wheel and the vehicle body. It is determined whether the time related mean wheel centers are situated approximately in a common plane. If not, a warning signal is generated, indicating defective tire air pressure.

2 Claims, 2 Drawing Sheets

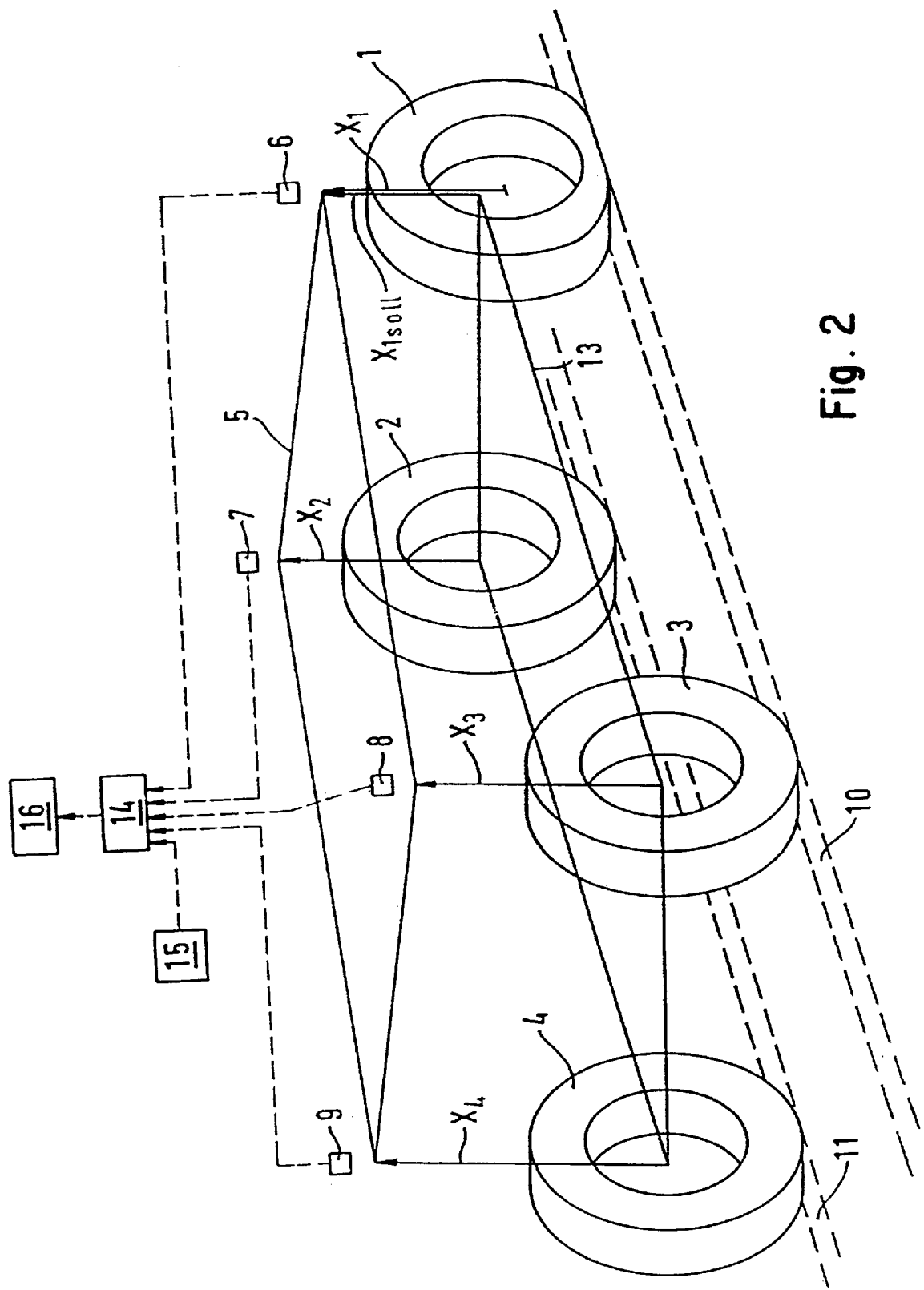

VEHICLE HAVING POSITION GENERATORS ASSIGNED TO THE WHEELS

BACKGROUND AND SUMMARY OF THE INVENTION

Figure 1:
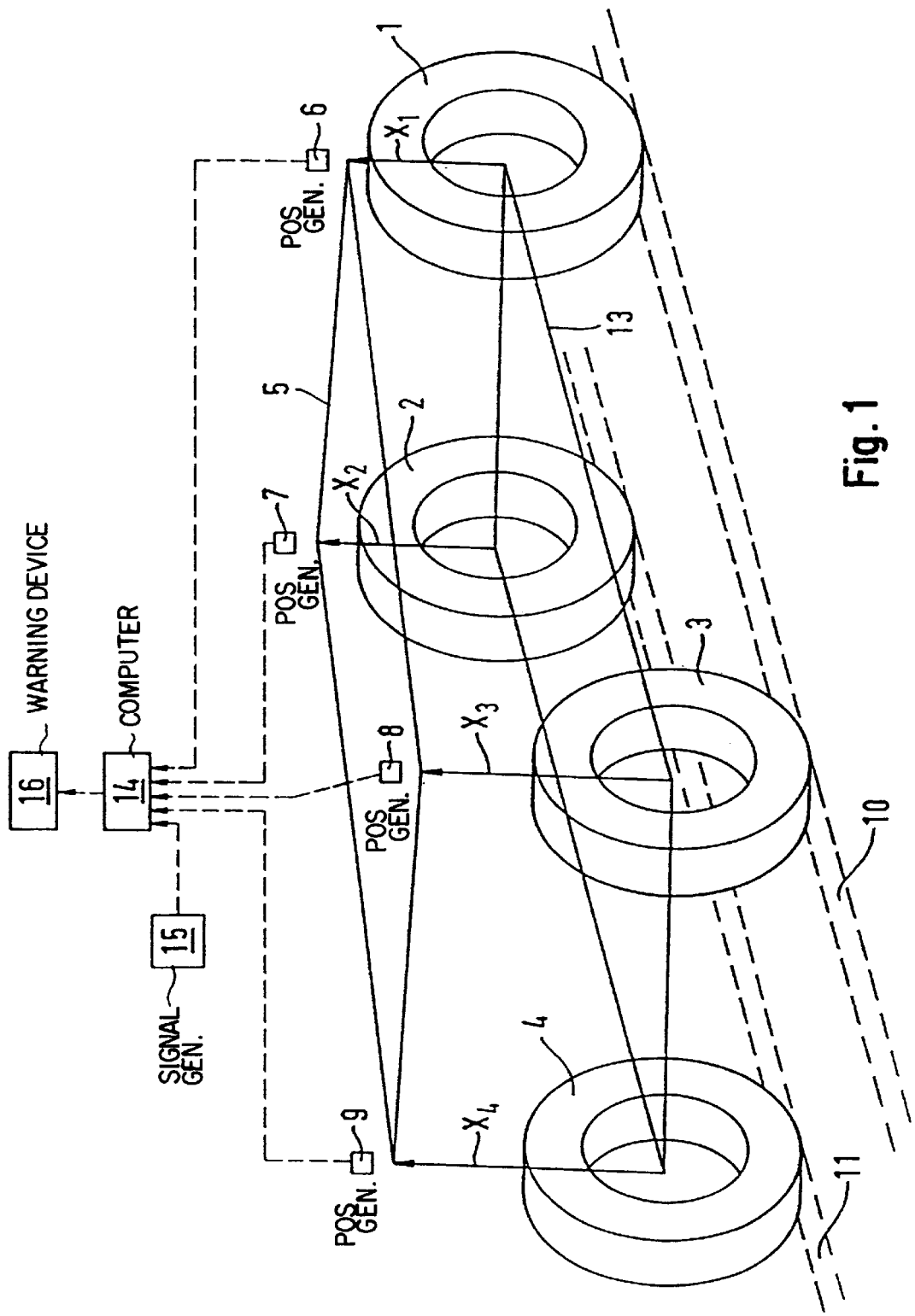

This application claims the priority of German patent document 196 45 897.8, the disclosure of which is expressly incorporated by reference herein.

The invention relates to a vehicle which has at least four wheels, which are arranged on two axles, can be cushioned relative to the vehicle body in the direction of a vertical axis of the body and are provided with inflatable tires, and which also has position generators which are assigned to the wheels and generate signals that provide an indication or determination of the respective vertical distances between the wheel centers and the body.

Free-moving motor vehicles having suspension systems of this generic type are known. The position generators may monitor, for example, the spring lifts of the wheels, and set shock absorbers assigned to the wheels to an increased damping effect when large spring lifts occur, as are typical of bad roads.

In addition, the position generators can be used in vehicles with a level control system or with a variable clearance from the ground for controlling support assemblies assigned to the wheels.

German patent document DE 39 20 165 A1 discloses an arrangement which examines whether a vehicle wheel clearly deviates in its height from a virtual plane which is given by the position of three other wheels on two axles (for example a plane which contains the wheel centers). In the event of an extreme deviation of a wheel from such a plane, there will be no position correction of the vehicle body under given driving conditions, because such deviations typically occur when one vehicle wheel is driven over a considerable elevation, for example, the edge of a curb, or over a pronounced depression. As a rule, it is not useful in such cases for an automatic level control system to intervene.

German patent document DE-OS 23 47 793, discloses an arrangement which takes into consideration, in the case of a spring arrangement with a level control system, extreme height deviations of a wheel from a level predetermined by the other wheels when controlling the carrying capacity distribution of the wheels.

These known systems take advantage of the fact that the position of a plane is determined by three points which are spaced away from one another, and which together form the corner points of a (true) triangle. Correspondingly, the position of three wheels on two axles defines a plane relative to the vehicle body, and it is therefore possible to determine whether the additional wheel or additional wheels take up a position which matches this plane.

It is an object of the invention to provide a new and improved arrangement for analyzing the signals of the position generators.

This object is achieved by the detection arrangement according to the invention, in which for each wheel, time-related mean values are determined for the distance between the wheel and the vehicle body and, from the mean values of three wheels on two axles, a desired center position of an additional wheel is then determined. A warning signal for an unequal tire pressure is generated if the actual center position of the additional wheel deviates excessively (that is, by more than a given tolerance) from the desired center position.

The invention is based on the general idea of utilizing the fact that, on a flat road, if the wheels and the tires are of the same type for each axle and have the same air pressure, the wheel centers of the wheels of two axles must be situated in a plane. The position of this plane relative to the body of the vehicle can be determined from the signals of the position generators.

Since the mentioned plane is already determined by the position of three wheels on two axles, a desired position for the fourth wheel can be determined from the positions of these three wheels, which desired position would have to be taken up by this wheel relative to the vehicle body if the ground is flat. Larger deviations of the actual position from the desired position indicate with an almost certain probability that the tire pressure of the wheels is unequal.

Although a completely even road can rarely be expected in practice, it may, as a rule, be assumed that uneven road conditions can be compensated by taking the time-related mean of the signals of the position generators; that is, the road can be "levelled" by the above-mentioned taking of the mean so that, as a result, an unequal tire pressure remains determinable at the tires of the wheels of one axle.

According to a preferred embodiment of the invention, the taking of the mean can be made more reliable by analyzing the signals of the position generators only above a predetermined limit speed which as a rule is reached or exceeded only in the case of comparatively good roads.

In addition to improving the measuring accuracy, this approach also takes into account the fact that unequal inflation of the tires of one axle has a negative influence on the driving safety only at higher driving speeds.

Because a warning signal can also be generated only above a predetermined threshold speed, the driver may drive to a gas station or repair shop at a moderate speed in order to correct the pressure of the tires, or carry out a tire change, without being irritated by a warning signal.

Other objects, advantages and novel features of the present invention will become apparent from the following detailed description of the invention when considered in conjunction with the accompanying drawings.

BRIEF DESCRIPTION OF THE-DRAWINGS

FIG. 1 is a schematic representation of a two-axle vehicle having four wheels which take up a position in a common wheel plane; and FIG. 2 is a similar representation but in which one wheel takes up a comparatively low position because of tire damage.

DETAILED DESCRIPTION OF THE DRAWINGS

According to FIG. 1, a motor vehicle, which is not shown in detail, has front wheels 1 and 2 as well as rear wheels 3 and 4. (It is assumed in the illustrated embodiment that the track width of the front wheels 1 and 2 is identical with the track width of the rear wheels 3 and 4.) Furthermore, the vehicle also has a body, of which only the body plane 5 is shown. The wheels 1 to 4 are supported with respect to the vehicle body by spring assemblies (not shown), each of which has a position generator 6–9 assigned to it. Signals from the position generators 6–9 indicate the respective distance $X_1$ to $X_4$ between the wheel centers and the body plane 5 along a vertical body axis.

In the example of FIG. 1, it is assumed that the tires of the wheels 1 to 4 each have a correct air pressure. This means that the front wheels 1 and 2, on the one hand, and the rear wheels 3 and 4, on the other hand, have the same tire pressures. In addition, it is assumed in FIG. 1 that the wheels 1 to 4 are standing or rolling on lane strips 10 and 11 which are contained in a common plane.

Because the tire pressures on each axle are the same, the wheel centers of the wheels 1 to 4 must then be situated in a common wheel center plane 13. In relation to the vehicle body plane 5, the position of the wheel center plane 13 in FIG. 1 can be indicated by an arbitrary triple of the values $X_1$ to $X_4$, independently of the position of the vehicle body plane 5 relative to the plane of the lane strips 10 and 11.

Because the wheel centers of the wheels 1 to 4 in the example of FIG. 1 are situated in a common wheel center plane 13 and the position of this plane 13 relative to the vehicle body plane 5 is determined by an arbitrary triple of the distances $X_1$ to $X_4$ a desired value for the distance of the fourth wheel $X_{ndes}$ can be determined from the distances of three wheels with respect to the vehicle body plane 5. Thus, the following applies:

$$X_{1des}=S_{vh}(X_3-X_4)+X_2$$

$$X_{2des}=S_{vh}(X_4-X_3)+X_1$$

$$X_{3des}=S_{hv}(X_1-X_2)+X_4$$

$$X_{4des}=S_{hv}(X_2-X_1)+X_3$$

wherein $S_{vh}$ is a proportionality ratio of the track widths of the wheels 1 and 2 to that of the wheels 3 and 4, and $S_{hv}$ is the corresponding proportionality ratio of the wheels 3 and 4 to the wheels 1 and 2.

FIG. 2 shows the conditions which occur if only the tires of wheels 2 to 4 have the correct air pressure, while the tire of wheel 1 has an air pressure which is clearly too low. If in this case, the wheels 1 to 4, in turn, stand or roll in the driving lanes 10 and 11 contained in a common plane, the wheel centers of the wheels 2 to 4 can be situated in a common plane 13. However, the wheel center of wheel 1 is situated below this plane 13. Thus, the actual value $X_1$ of the distance between the wheel center of wheel 1 and the vehicle body plane 5 deviates clearly from the desired value $X_{1des}$ which would occur if the tire of wheel 1 had the same air pressure as the tire of wheel 2.

Analogous conditions occur if in FIG. 2 any three of the wheels 1 to 4 are selected arbitrarily, and a wheel center plane is considered which contains the centers of the selected wheels. The actual position of the respective remaining wheel will clearly be situated outside the wheel center plane for the three other wheels.

When a vehicle is driven, the lane strips through which the wheels 1 to 4 travel will only rarely form a completely common plane. In order to take this consideration into account respective time-related mean values for the values $X_1$ to $X_4$ are formed. From the mean values for any three of the four wheels 1 to 4, a mean desired value can then be calculated and compared with the corresponding actual mean value to determine whether all wheels 1 to 4 have the correct tire pressure.

As a result, a warning signal can then optionally be generated.

Preferably, it is provided that the signals $X_1$ to $X_4$ are analyzed only above a minimum speed for generating a possible defective tire pressure warning signal. In this manner, it can be ensured that the above-described queries take place only during a drive on relatively good roads, and furthermore that the calculation of the mean is carried out effectively.

For generating the warning signal, the position generators 6 to 9 need only be connected with the input side of a computer 14 of a sufficient capacity. An input to this computer 14 is connected with a signal generator 15 for the driving speed (speedometer). On the output side, the computer 14 controls a warning device 16 which can generate acoustic and/or visual signals.

Ordinarily, such a computer 14 already exists in the vehicle for different purposes. In this case, it is necessary only to transmit the above-described analysis of the signals $X_1$ to $X_4$ of the position generators 6 to 9 to the existing computer.

When the tires of all wheels 1 to 4 have the correct air pressure, the system according to the invention can also be used for examining the correct functioning of the position generators 6 to 9. That is, when the tire air pressure is correct, the wheel centers of wheels 1 to 4 in a time-related mean on a good road and at an increased speed must be situated in a common plane. Thus, the generation of a warning signal by the warning device 16 in this case indicates defective operation of one of the position generators 6 to 9.

It should be noted that the position of the vehicle body plane 5 relative to the plane of the driving lanes 10 and 11 is without significance. FIGS. 1 and 2 therefore illustrate different positions of the plane 5. Plane 5 is used only as a reference plane for the distances $X_1$ to $X_4$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle having at least four wheels which are arranged on two axles, can be cushioned relative to a body of the vehicle in the direction of a vertical axis of the body and are provided with inflatable tires, and having a tire pressure alarm system comprising:

at least four position generators, one such position generator being assigned to each wheel;

signals from said position generators providing an indication of respective vertical distances between an associated wheel center and a body of the vehicle; and a control unit which is coupled to receive signals from said position generators, and which is programmed to determine for each wheel a time-related mean values for said vertical distance;

determine from the mean values of three wheels on two axles, a desired center position of a fourth wheel; and determine that an unequal tire pressure exists if an actual center position of said fourth wheel deviates by more than a given tolerance from the desired value; and generate an alarm in response to a determination that unequal tire pressure exists.

2. Vehicle according to claim 1, wherein the control unit analyzes the mean values only when speed of the vehicle exceeds a predetermined minimum value.

* * * * *